United States Patent [19]

Takahashi

[11] Patent Number: 4,916,660
[45] Date of Patent: Apr. 10, 1990

[54] NEST LEVEL JUDGING HARDWARE DEVICE FOR HIGH SPEED MESSAGE HANDLING SYSTEMS

[75] Inventor: Kousuke Takahashi, Tokyo, Japan

[73] Assignee: NEC Corporation, Tokyo, Japan

[21] Appl. No.: 217,198

[22] Filed: Jul. 11, 1988

[30] Foreign Application Priority Data

Jul. 9, 1987 [JP] Japan ................. 62-172151
Jan. 6, 1988 [JP] Japan ................... 63-1483

[51] Int. Cl.$^4$ .................. G06F 15/00; G06F 7/04
[52] U.S. Cl. ..................... 364/900; 364/919;
364/940.81; 364/942.7; 364/947.5; 370/85.4
[58] Field of Search .............. 370/86, 94; 364/514,
364/200 MS File, 900 MS File

[56] References Cited

U.S. PATENT DOCUMENTS 4,747,100  3/1988  Roach et al. .................. 370/86
4,750,114  6/1988  Hirtle ............................ 364/200

OTHER PUBLICATIONS

William Stallings, Ph.D., "Data and Computer Communications", Macmillan Publishing Company, pp. 394-408, New York, N.Y.

*Primary Examiner*—Thomas C. Lee
*Attorney, Agent, or Firm*—Foley & Lardner, Schwartz, Jeffery, Schwaab, Mack, Blumenthal & Evans

[57] ABSTRACT

A nest level judging device is operable in response to tokens each of which is given a nest level selected from first through N-th nest levels as a selected level and each of which comprises a data length code and a data identifier code including a nest bit. A detecting circuit (50) detects the nest bit to produce a nest bit detection signal. Responsive to selection signals, a selecting circuit (30) delivers the data length codes of the respective tokens as first through N-th data codes. A processing circuit (40) processes the first through the N-th data codes into a processed signal which is N bits long. Responsive to the nest bit detection signal and the first through the N-th data codes, a level decision circuit (60) decides a decided nest level indicative of, as the selected level, one of the first through the N-th nest levels that is selected as the selected level. The level decision circuit (60) supplies the decided nest level as one of the selection signals to the selection circuit.

10 Claims, 9 Drawing Sheets

| SC | PS(1) | PS(2) | PS(3) | PS(4) | S(1) | S(2) | S(3) | S(4) |
|---|---|---|---|---|---|---|---|---|
| 1 | 0 | 0 | 0 | 0 | 1 | 2 | 3 | 4 |
| 1 | 1 | 0 | 0 | 0 | 2 | | | |
| 1 | 0 | 1 | 0 | 0 | | 3 | | |
| 1 | 0 | 0 | 1 | 0 | | | 4 | |
| 0 | 0 | 0 | 0 | 0 | 1 | 2 | 3 | 4 |
| 0 | 1 | 0 | 0 | 0 | 1 | | | |
| 0 | 0 | 1 | 0 | 0 | | 2 | | |
| 0 | 0 | 0 | 1 | 0 | | | 3 | |
| 0 | 0 | 0 | 0 | 1 | | | | 4 |
| 0 | 1 | 1 | 0 | 0 | | 1 | | |
| 0 | 0 | 1 | 1 | 0 | | | 2 | |
| 0 | 0 | 0 | 1 | 1 | | | | 3 |
| 0 | 1 | 1 | 1 | 0 | | | 1 | |
| 0 | 0 | 1 | 1 | 1 | | | | 2 |
| 0 | 1 | 1 | 1 | 1 | | | | 1 |

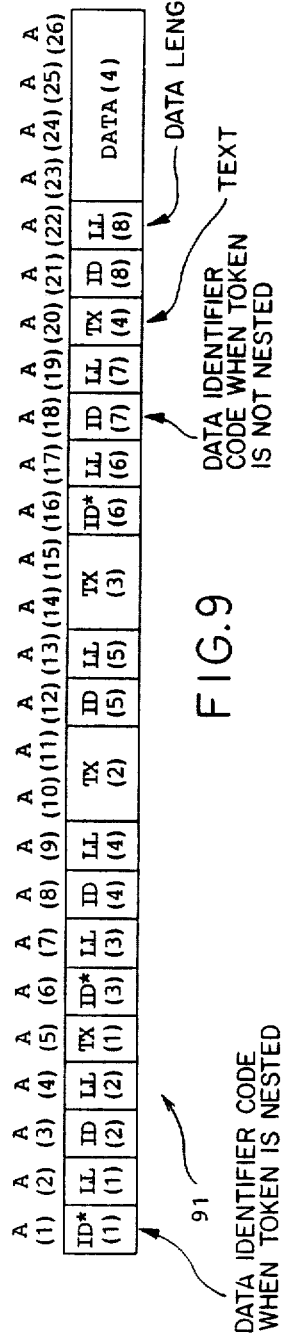

NEST LEVEL JUDGING HARDWARE DEVICE FOR HIGH SPEED MESSAGE HANDLING SYSTEMS

BACKGROUND OF THE INVENTION

This invention relates to a nest level judging device for use in a protocol conversion system.

A protocol conversion system of the type described, is for use in an information communication network between heterogeneous data processing systems. The information communication network between heterogeneous data processing systems is for mutually connecting between the heterogeneous data processing systems in a local area or between local areas to carry out information interchange between the heterogeneous data processing systems. Such an information communication network is expected to spread wide in society of information. In general, the information communication network is built on the basis of a network architecture systematized according to a protocol.

Inasmuch as a such protocol has been originally developed by each of computer makers, it is impossible to carry out the information interchange between the heterogeneous data processing systems. In order to solve this problem, a standard protocol has been established by International Organization for Standardization (ISO). This standard protocol is called a layer protocol of Open Systems Interconnection (OSI) in the art. Such a layer protocol is disclosed in a book written by William Stallings under the title of "DATA AND COMPUTER COMMUNICATIONS", pages 394 to 408, Chapter 12.

The layer protocol consists of seven layers which comprise a physical layer, a data link layer, a network layer, a transport layer, a session layer, a presentation layer, and an application layer. Each layer of the layer protocol has a processing function which should be standardized between the computer makers. Inasmuch as the layer protocol of the OSI is well-defined, it is possible to carry out protocol conversion between the layer protocol and a specific protocol developed by each computer maker. Each of the heterogeneous data processing systems comprises a protocol conversion system which carries out the protocol conversion. By the protocol conversion, it is possible to carry out the information interchange between the heterogeneous data processing systems.

Attention will be directed to the application layer. As is known in the art, the application layer is divisible into first through N-th sublayers where N represents a predetermined natural number which is equal to, for example, sixty-four. The first through the N-th sublayers are referred to first through N-th nest levels, respectively, in the art. The first through the N-th nest levels are a lowest through a highest nest level, respectively. According to the application layer, data transmission is carried out between the heterogeneous data processing systems on the basis of Message Handling Systems (MHS) recommended by the International Telegraph and Telephone Consultive Committee (CCITT) Recommendation X.409. More specifically, data transmitted between the heterogeneous data processing systems are a plurality of tokens. Each of the tokens is given a nest level selected from the first through the N-th nest levels as a selected level. Each of the tokens comprises a header and a data set as described in the Chapter 12 of the above-mentioned book. The data set has a data length and is for nesting one of the tokens that has a higher nest level than the selected level and will be referred to as a particular token. The header comprises a data length code representative of the data length and a data identifier code. The data identifier code includes a nest bit indicative of whether or not the particular token is nested in the data set.

In the protocol conversion system, the selected level must be judged. A conventional method for judging the selected level has been performed by software in computers. According to the conventional method, the tokens are memorized in a main memory as memorized tokens. Codes of the respective memorized tokens are successively read from the main memory to a central processing unit (CPU) as read codes. The software is used in judging the selected level from the read codes. The conventional method has been therefore disadvantageous in that a large processing time is consumed to judge the selected level. As a result, it is impossible to rapidly and smoothly carry out the information interchange.

SUMMARY OF THE INVENTION

It is an object of this invention to provide a nest level judging device which is operable at a high speed.

Other objects of this invention will become clear as the description proceeds.

A nest level judging device to which this invention is applicable, is operated in response to a plurality of tokens one at a time. Each of the tokens is given a nest level selected from first through N-th nest levels as a selected level, where N represents a predetermined natural number. The first through the N-th nest levels are a lowest through a highest nest level, respectively. Each of the tokens comprises a header and a data set. The data set has a data length and is for nesting a particular one of the tokens that has a higher nest level than the selected level. The header comprises a data length code representative of the data length and a data identifier code which includes a nest bit indicative of whether or not the particular one of the tokens is nested in the data set. According to this invention, the nest level judging device is for judging the selected level and comprises a detecting stage supplied with the data identifier code for detecting the nest bit to produce a nest bit detection signal when the nest bit indicates that the particular one of the tokens is nested in the data set, a selecting stage supplied with the header and having first through N-th output ports in correspondence to the first through the N-th nest levels, respectively, for selecting in response to each of successively supplied selection signals the first through the N-th output ports one as a selected port at a time to deliver the data length code to the selected port, the selecting stage thereby delivering the data length codes of the respective tokens in response to the selection signals to the first through the N-th output ports as first through N-th data codes, a processing stage coupled to the selecting stage for processing the first through the N-th data codes into a processed signal which is N bits long, and a level decision stage coupled to the detecting stage and the processing stage for deciding in response to the nest bit detection signal and the processed signal a decided nest level indicative of one of the first through the N-th nest levels that is selected as said selected level, the nest level decision stage supplying the selecting stage with the decided nest level as one of the selection signals that next follows each of the selection signals.

BRIEF DESCRIPTION OF THE DRAWING:

FIG. 9 shows an example of tokens memorized in a first memory area of a main memory for use in the nest level judging device depicted in FIG. 8;

FIG. 10 shows an example of a result stored in a second memory area of the main memory and processed by the nest level judging device depicted in FIG. 8;

DESCRIPTION OF THE PREFERRED EMBODIMENTS:

Referring to FIGS. 1(a) through (e) description will be made at first with regard to a token train transmitted between heterogeneous data processing systems (not shown). The token train comprises a plurality of tokens. Each of the tokens is given a nest level selected from first through N-th nest levels as a selected level, where N represents a predetermined natural number which is equal to, for example, sixty-four. The first through the N-th nest levels are a lowest through a highest nest level, respectively. Each of the tokens comprises a header and a data set. The data set is either data, such as DATA(1) through DATA(4), or a text, such as TX(1) through TX(4). The data DATA (suffixes omitted) may correspond to a body of a letter. The text TX (suffixes omitted) may correspond to a title or a gist of the letter. The data set has a data length and is for nesting one of the tokens that has a higher nest level than selected level by one level and will be referred to as a particular token. The header comprises a data length code, such as LL(1) through LL(8), representative of the data length and a data identifier code representative of a processing function of the data set. The data identifier code includes a nest bit indicative of whether or not the particular token is nested in the data set. The data identifier code is depicted at ID* (suffixes omitted) when the nest bit indicates that the particular token is nested in the data set. In this event, the nest bit may have a logic "1" level. The data identifier code is depicted at ID (suffixes omitted) if the nest bit indicates that the particular token is not nested in the data set. Under the circumstances, the nest bit has a logic "0" level.

The nest bit is ordinarily the most significant bit of each data identifier code ID or ID*. It is therefore possible to understand that the nest bit is depicted by the leftmost vertical line of the data identifier code in each of FIGS. 1(a) to (e).

Figure 1:
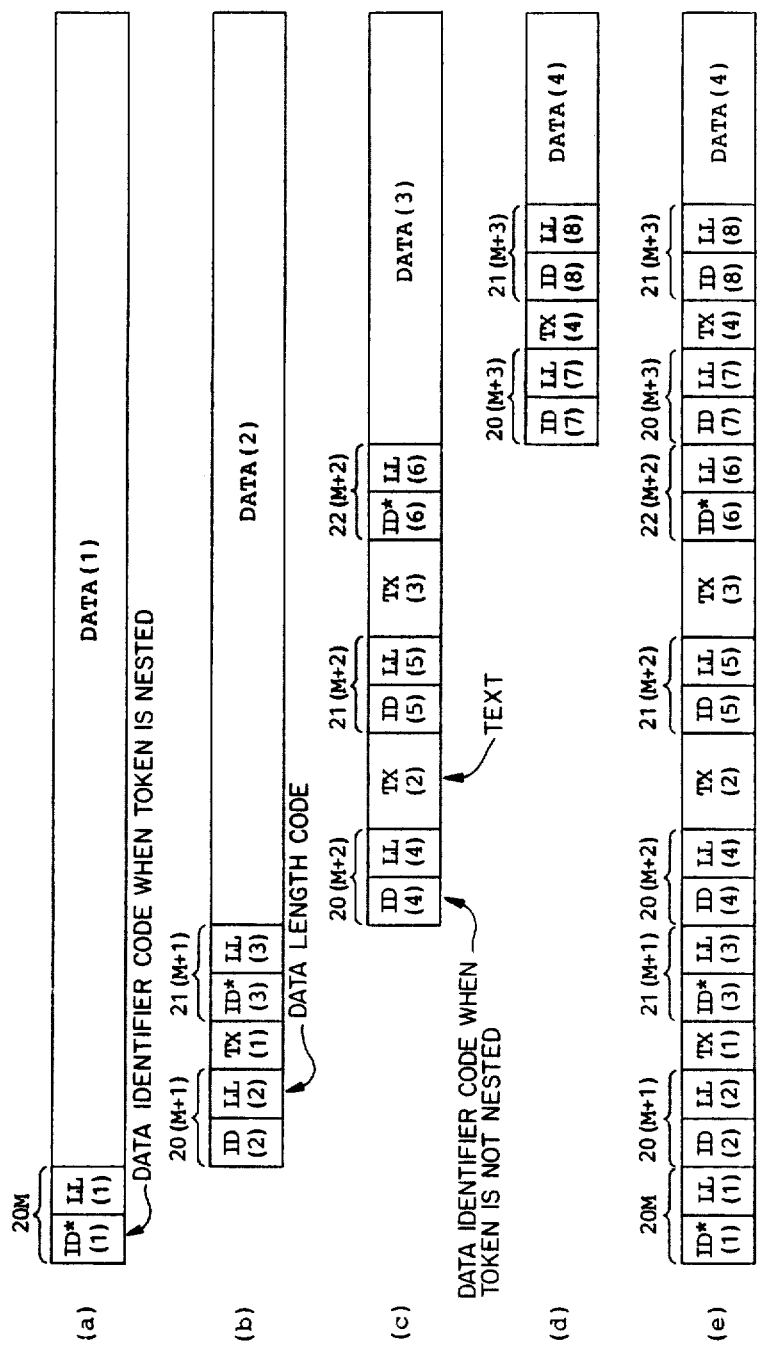
FIGS. 1(a) through (e) show examples of tokens having different nest levels and a token train comprising the tokens supplied to a nest level judging device according to the present invention.

It will be assumed that tokens illustrated in FIGS. 1(a) to (d) are given M-th, (M+1)-th, (M+2)-th, and (M+3)-th nest levels, respectively, where M represents a positive integer which is not less than one and is not greater than the predetermined natural number N less three. In FIG. 1(a), a token having the M-th nest level comprises a header 20M in addition to the data DATA(1). The header 20M comprises a data identifier code ID*(1) including a nest bit of the logic "1" level and the data length code LL(1). Therefore, the data DATA(1) nests a plurality of tokens, each having the (M+1)-th nest level, as shown in FIG. 1(b). The token having the nest bit of the logic "1" level such as the token illustrated in FIG. 1(a) will be called a constructor token. On the contrary, the token having the nest bit of the logic "0" level will be called a primitive token.

In FIG. 1(b), one of tokens that has the (M+1)-th nest level, comprises a header 20(M+1) and the text TX(1). Another of tokens that has the (M+1)-th nest level comprise a header 21(M+1) and the data DATA(2). The header 20(M+1) comprises a data identifier code ID(2) including a nest bit of the logic "0" level and the data length code LL(2). The header 21(M+1) comprises a data identifier code ID*(3) including a nest bit of the logic "1" level and the data length code LL(3). Therefore, the data DATA(2) nests a plurality of tokens, each having the (M+2)-th nest level, as shown in FIG. 1(c).

In FIG. 1(c), one of tokens that has the (M+2)-th nest level, comprises a header 20(M+2) and the text TX(2). Another of tokens that has the (M+2)-th nest level comprises a header 21(M+2) and the text TX(3). Still another of tokens that has the (M+2)-th nest level comprises a header 22(M+2) and the data DATA(3). The header 20(M+2) comprises a data identifier code ID(4) and the data length code LL(4). The header 21(M+2) comprises a data identifier code ID(5) and the data length code LL(5). The header 22(M+2) comprises a data identifier code ID*(6) and the data length code LL(6). Therefore, the data DATA(3) nests a plurality of tokens, each having the (M+3)-th nest level, as shown in FIG. 1(d).

In FIG. 1(d), one of tokens that has the (M+3)-th nest level, comprises a header 20(M+3) and the text TX(4). Another of tokens that has the (M+3)-th nest level comprises a header 21(M+3) and the data DATA(4). The header 20(M+3) comprises a data identifier code ID(7) and the data length code LL(7). The header 21(M+3) comprises a data identifier code ID(8) and the data length code LL(8).

Referring to FIG. 1(e), the illustrated token train comprises the tokens as shown in FIGS. 1(a) to (d). It is assumed that the data length codes LL(1), LL(2), LL(3), LL(4), LL(5), LL(6), LL(7), and LL(8) are representative of data lengths L1, L2, L3, L4, L5, L6, L7, and L8, respectively. In addition, the headers 20M, 20(M+1), 21(M+1), 20(M+2), 21(M+2), 22(M+2), 20(M+3), and 21(M+3) have header lengths LH1, LH2, LH3, LH4, LH5, LH6, LH7, and LH8, respectively.

It should be noted here that there are a first and a second case as regards the data length represented by the data length code. In the first case, the data length is defined so as to make the data length comprise the header lengths which will presently be described. In the second case, the data length is defined so as not to make the data length comprise the header lengths.

In the first case, those lengths are related to one another by:

$$L1 = L2 + L3 + LH2 + LH3, \quad (1)$$

$$L3 = L4 + L5 + L6 + LH4 + LH5 + LH6, \quad (2)$$

$$\text{and } L6 = L7 + L8 + LH7 + LH8. \quad (3)$$

It is possible in general to understand that, when a token having an i-th nest level comprises a data identifier code ID*, a data length code LL(i) representative of a data length Li, and a data set DATA(i), another token having an (i+1)-th nest level is nested in the data set DATA(i), where i represents a natural number is not greater than the predetermined natural number N less one. After supplied with the data set DATA(i), the nest level, namely, a selected level is returned to the i-th nest level.

In the illustrated example of FIG. 1(e), the selected level is shifted from the M-th nest level to the (M+1)-th nest level after supplied with the header 20M. After the header 21(M+1) is supplied, the selected level is shifted from the (M+1)-th nest level to the (M+2)-th nest level. After the header 22(M+2) is supplied, the selected level is shifted from the (M+2)-th nest level to the (M+3)-th nest level. After the data DATA(4) is supplied, the selected level is shifted from the (M+3)-th nest level to the M-th nest level.

If, instead of Equation (1), the data length L1 is related to the data lengths L2 and L3 and the header lengths LH2 and LH3 by:

$$L1 > L2 + L3 + LH2 + LH3, \quad (1')$$

the selected level is shifted from the (M+3)-th nest level to the (M+1)-th nest level after the data DATA(4) is supplied.

Figure 2:
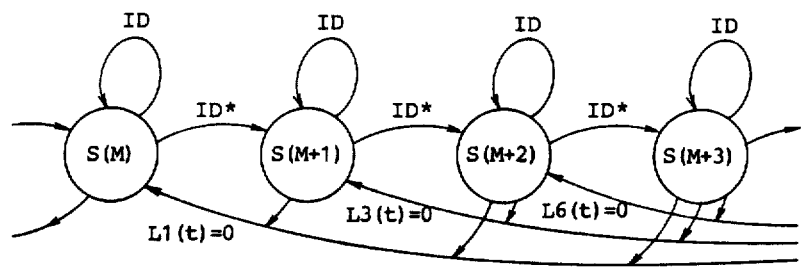
FIG. 2 shows a state transition diagram representative of state transition of a nest level of each of the tokens.

Referring to FIG. 2, description will be made in connection with state transition of the selected level of such as the token train illustrated in FIG. 1(e). M-th through (M+3)-th state nodes S(M), S(M+1), S(M+2), and S(M+3) indicate, as the selected level, the M-th nest level, the (M+1)-th nest level, the (M+2)-th nest level, and the (M+3)-th nest level, respectively. The state nodes are connected to one another by transition paths, each of which is depicted by a curved line with an arrow. The conditions for the state transition are labelled besides the respective transition paths. When the condition is satisfied, the state transition of the selected level occurs between the state nodes.

Description will be made with regard to the state transition diagram illustrated in FIG. 2 when the token train illustrated in FIG. 1(e) is supplied. It will be assumed that the state of the token or the selected level is initially put into the m-th state node S(M). Inasmuch as the header 20M comprises the data identifier code ID*(1) including the nest bit of the logic "1" level, the state then transits from the M-th state node S(M) to the (M+1)-th state node S(M+1). If the header 20M comprises the data identifier code ID including the nest bit of the logic "0" level, the state is maintained at the M-th state node S(M). As mentioned before, the header 20M comprises the data length code LL(1) indicative of the data length L1 of the data DATA(1). It is assumed that a remaining length of the data DATA(1) supplied is depicted at L1(t). The remaining length L1(t) is decremented by a number of codes of the data DATA(1) supplied that is represented by t. That is, the remaining length L1(t) is given by:

$$L1(t) = L1 - t.$$

When the remaining length L1(t) is equal to zero, the state returns to the M-th state node S(M).

Similarly, supplied with the data identifier code ID*(3) after the state shifts to the (M+1)-th state node S(M+1), the state shifts from the (M+1)-th state node S(M+1) to the (M+2)-th state node S(M+2). As long as the remaining length L1(t) is greater than zero, the state returns to the (M+1)-th state node S(M+1) when the remaining length L3(t) of the data DATA(2) is equal to zero.

In a protocol conversion, it is necessary to judge the selected level, namely, the state transition diagram. This is because each of the data identifier codes is not identified unless the selected level is judged.

Figure 3:
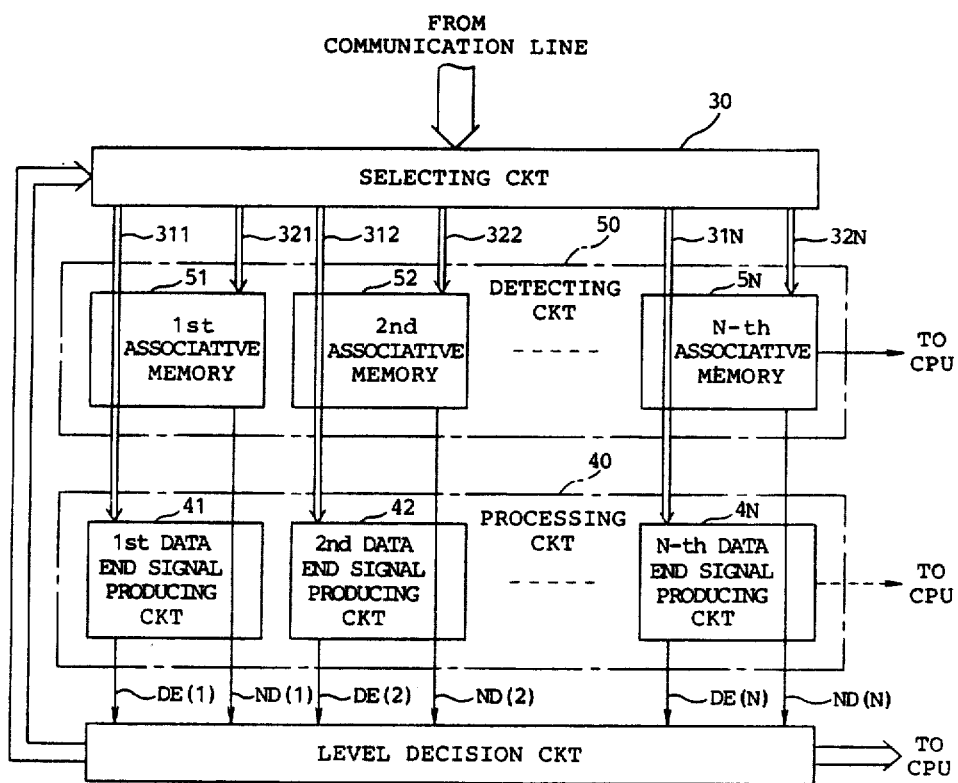
FIG. 3 is a block diagram of a nest level judging device according to a first embodiment of the present invention.

Referring to FIG. 3, a nest level judging device according to a first embodiment of the present invention is for judging the selected level of each of the tokens such as the token train illustrated in FIG. 1(e).

The illustrated nest level judging device is successively supplied with codes of the token train as input codes through a communication line (not shown). The nest level judging device comprises a selecting circuit 30 having first through N-th output ports 311, 312, ..., and 31N in correspondence to the first through the N-th nest levels, respectively. Supplied with the header, the selecting circuit 30 is for selecting in response to each of successively supplied selection signals (later described) the first through the N-th output ports 311 to 31N one as a selected port at a time to deliver the data length code to the selected port. The selecting circuit 30 thereby delivers the data length codes of the respective tokens in response to the selection signals to the first through the N-th output ports 311 to 31N as first through N-th data codes.

The selecting circuit 30 is coupled to the processing circuit 40 for processing the first through the N-th data codes into a processed signal which is N bits long. The processing circuit 40 comprises first through N-th end signal producing circuits 41, 42, and 4N coupled to the first through the N-th output ports 311 to 31N, respectively. The first through the N-th end signal producing circuits 41 to 4N are for holding the first through the N-th data codes as first through N-th held codes, respectively. Each of the first through the N-th end signal producing circuits 41 to 4N is supplied with a clock signal (not shown) in synchronism with each input code. The first through the N-th end signal producing circuits 41 to 4N are for decreasing the first through the N-th held codes in response to the clock signal to produce first through N-th data end signals DE(1) to DE(N) as the processed signal when the first through the N-th held codes are decreased to zero, respectively.

The selecting circuit 30 further has first through N-th additional output ports 321, 322, ..., and 32N in correspondence to the first through the N-th nest levels, respectively. The selecting circuit 30 is furthermore for selecting in response to each of the successively supplied selection signals one of the first through the N-th additional output ports 321 to 32N as a selected additional port at a time to deliver the data identifier code to the selected additional port. The selecting circuit 30 thereby delivers the data identifier codes of the respective tokens in response to the selection signals to the first through the N-th additional ports as first through N-th identifier codes.

The selecting circuit 30 is coupled to a detecting circuit 50. Supplied with the data identifier code through the selecting circuit 30, the detecting circuit 50 is for detecting the nest bit to produce a nest bit detection signal when the nest bit indicates that the particular token is nested in the data set. In FIG. 3, the nest bit detection signal consists of first through N-th bits. The detecting circuit 50 comprises first through N-th associative memories 51, 52, ..., and 5N coupled to the first through the N-th additional outputs 321 to 32N, respectively. The first through the N-th associative memories 51 to 5N have memory locations for preliminarily memorizing first through N-th memorized identifier codes, respectively. The first through the N-th associative memories 51 to 5N are for deciding match between the first through the N-th identifier codes and one of the first through the N-th memorized identifier codes to produce first through N-th identified codes representative of the memory locations for the first through the N-th memorized identifier codes, respectively. The first through the N-th associative memories 51 to 5N produce first through N-th partial nest bit detection signals ND(1) to ND(N) as the first through the N-th bits of the nest bit detection signal, respectively.

The nest level judging device further comprises a level decision circuit 60 coupled to the detecting circuit 50 and the processing circuit 40. The level decision circuit 60 is for deciding in response to the nest bit detection signal and the processed signal a decided nest level indicative of one of the first through the N-th nest levels that is selected as the selected level. The level decision circuit 60 produces the decided nest level as one of the selection signals that is supplied to the selecting circuit 40 next following each of the selection signals. The decided nest level is supplied to a central processing unit (not shown).

In FIG. 3, each of the first through the N-th associative memories 51 to 5N preliminarily memorizes a request mark bit indicative of a particular one of the data identifier codes. The particular data identifier code is included, for example, in the primitive token. When the match is detected, each of the first through the N-th associative memories 51 to 5N produces a match signal if the respective request mark bit has the logic "1" level.

Figure 4:
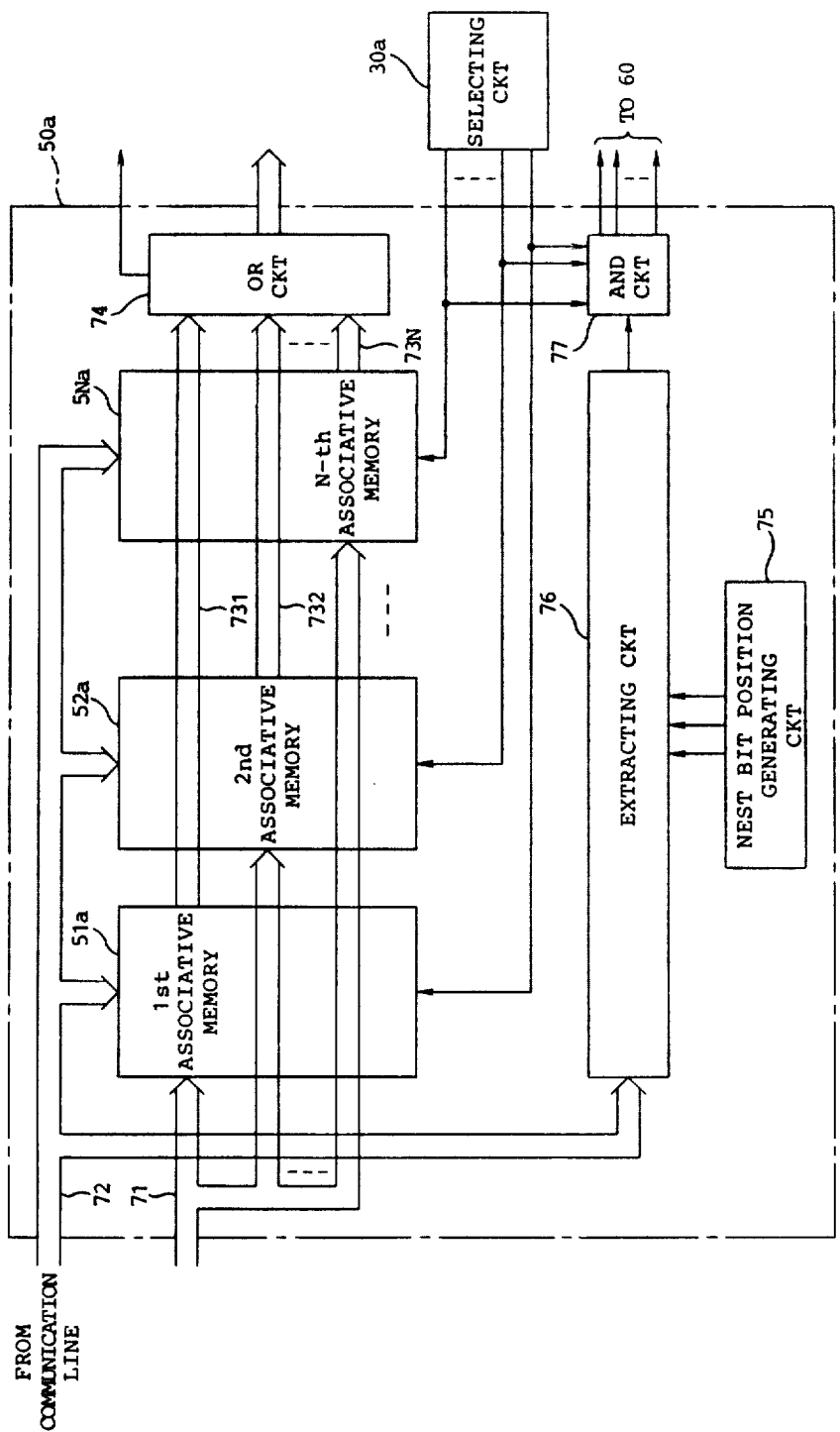
FIG. 4 is a block diagram of a detecting circuit for use in a nest level judging device according to a second embodiment of the present invention.

Referring to FIG. 4, a nest level judging device according to a second embodiment of this invention is similar to that illustrated in FIG. 3. The selecting circuit and the detecting circuit are modified from that illustrated in FIG. 3 as will later become clear. The selecting circuit and the detecting circuit are therefore depicted at 30a and 50a, respectively. The processing circuit and level decision circuit are omitted.

The selecting circuit 30a produces in response to each of the selection signals a choosing signal which consists of first through N-th choosing bits.

The detecting circuit 50a is directly and successively supplied with the input codes of the token train. Each of the first through the N-th associative memories is modified from that illustrated in FIG. 3 as will presently become clear. The first through the N-th associative memories are therefore depicted at 51a, 52a, ..., and 5Na. The input codes are successively supplied to the first through the N-th associative memories 51a to 5Na. The first through the N-th associative memories 51a to 5Na are supplied with the first through the N-th choosing bits of the choosing signal, respectively. In response to the choosing signal, one of the first through the N-th associative memories 51a to 5Na becomes an active state and is selected as a selected associative memory. Each of the first through the N-th associative memories 51a to 5Na is supplied with a storage address code from an address input terminal 71 when identifier codes are successively supplied from a data input terminal 72 and stored in the first through the N-th associative memories 51a to 5Na as the first through the N-th memorized identifier codes, respectively. The first through the N-th associative memories 51a to 5Na have first through N-th output terminals 731, 732, and 73N for delivering the first through the N-th identified codes, respectively. The first through the N-th output terminals 731 to 73N are coupled to an OR circuit 74 for producing an OR'ed N-th identified code. The OR circuit 74 further produces the match signal when any one of the first through the N-th identified codes is supplied.

The detecting circuit 50a comprises a nest bit position generating circuit 75 for generating a nest bit position code indicative of a position where the nest bit is present. The nest bit position generating circuit 75 is coupled to an extracting circuit 76 supplied with the input codes from the data input terminal 72. The extracting circuit 76 is for extracting in response to the nest bit position code the nest bit to produce an extracted nest bit. The extracting circuit 76 is coupled to an AND circuit 77 supplied with the choosing signal from the selecting circuit 30a. The AND circuit 77 acts as a signal producing arrangement for producing the choosing signal as the nest bit detection signal when the extracted nest bit has the logic "1" level.

Figure 5:
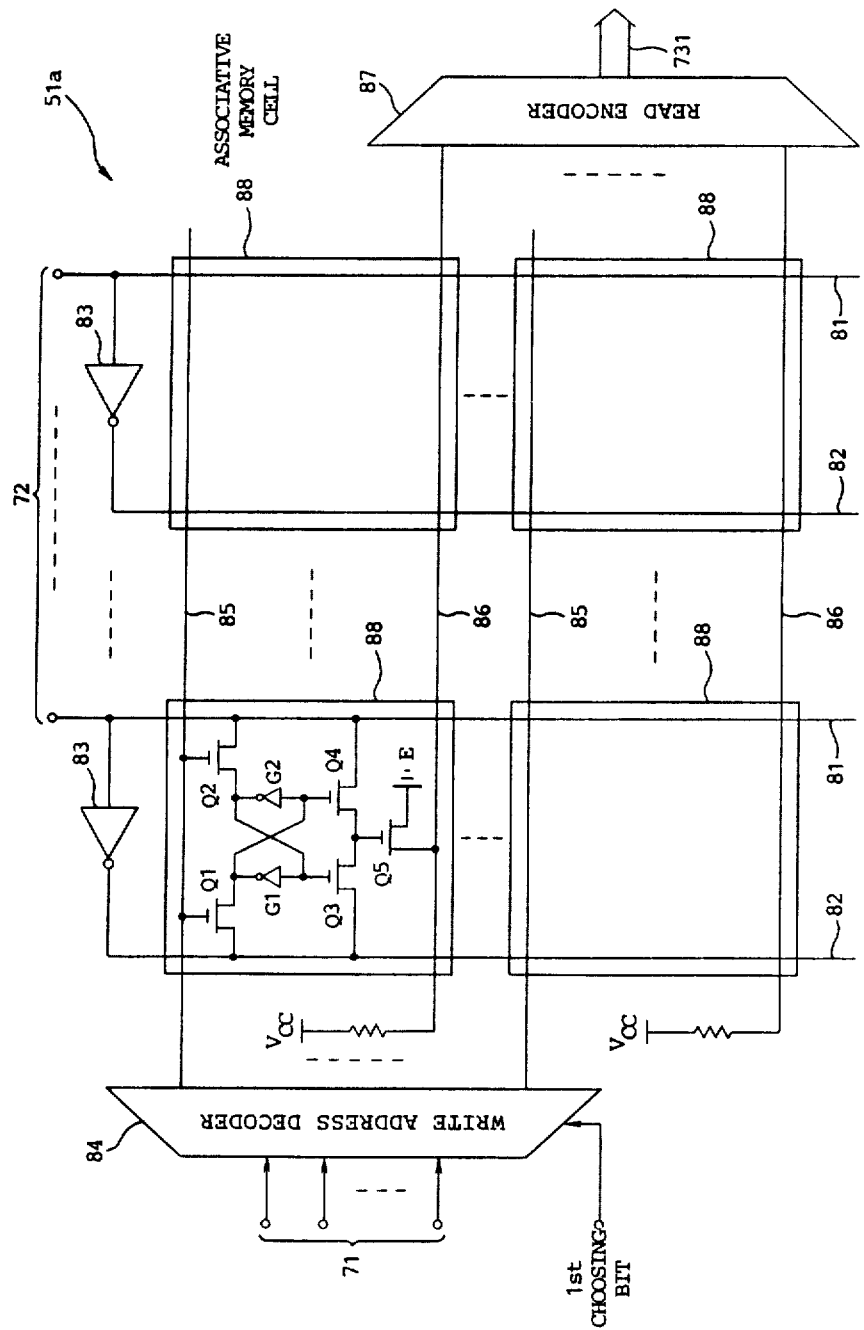
FIG. 5 is a block diagram of an associative memory for use in the detecting circuit depicted in FIG. 4.

Referring to FIG. 5, the first associative memory 51a comprises a plurality of primary bit lines 81 coupled to the data input terminal 72 and a plurality of secondary bit lines 82 coupled to the data input terminal 72 through inverters 83. The first associative memory 51a further comprises a write address decoder 84 coupled to the address input terminal 71. The write address decoder 84 is connected to a plurality of word lines 85 and supplied with the first choosing bit of the choosing signal. The write address decoder 84 is for selecting one of the word lines 85 in response to the storage address code when the first choosing bit of the logic "1" level is supplied. The first associative memory 51a is provided with a plurality of sense lines 86 for detecting the match to produce a sensed signal. The sense lines 86 are arranged along the word lines 85 and equal in number to the word lines 85. The sense lines 86 have ends connected to a read encoder 87 for encoding the sensed signal into an encoded signal as the first identified code. Each of the sense lines 86 has another end connected to a power terminal Vcc through a clamp resistor R. The first associative memory 51a comprises a plurality of associative memory cells 88. Each of the associative memory cells 88 is connected to one of the word lines 85, to one of the sense lines 86, and to one pair of the primary and the secondary bit lines 81 and 82.

It should be noted that the first associative memory 51a is operable either in a storing mode for storing the identifier codes in the associative memory cells 88 as the first memorized identifier codes or in a detecting mode for detecting the match between the data identifier code and one of the first memorized identifier codes. In the storing mode, each of the identifier codes is stored as the first memorized identifier code in the associative memory cells 88 arranged along one of the word lines 85 that is selected by the write address decoder 84. In the detecting mode, the sensed signal is produced through one of the sense lines 86 that is connected to the associative memory cells 88 storing the first memorized identifier code coincident to the data identifier code supplied through the data input terminal 72, and the first identified code is produced by the read encoder 87.

Each associative memory cell 88 comprises a flip-flop comprising first and second inverters G1 and G2 for memorizing one bit which is either the logic "1" level or the logic "0" level as a memorized bit. The first inverter G1 has an output connected to an input of the second inverters G2 which, in turn, has an output connected back to an input of the first inverter G1. The output of the first inverter G1 is connected to one of the secondary bit lines 82 through a first transistor Q1 which has a gate connected to one of the word lines 85. The output of the second inverter G2 is connected to one of the primary bit lines 81 through a second transistor Q2 which has a gate connected to one of the word lines 85 that is connected to the gate of the first transistor Q1. One of the second bit lines 82 is connected to one of the primary bit lines 81 through third and fourth transistors Q3 and Q4 which have gates connected to the inputs of the first and the second inverters G1 and G2, respectively. One of the sense lines 86 is connected to an earth terminal E through a fifth transistor Q5 which has a gate connected to a point of connection between the third and fourth transistors Q3 and Q4.

When the first and the second transistors Q1 and Q2 are selected by the write address decoder 84 through the afore-mentioned one of the word lines 85, one bit is supplied from the one pair of the primary and the secondary bit lines 81 and 82 and is stored in the flip-flop as the memorized bit. When one bit is supplied from the one pair of the primary and the secondary bit lines 81 and 82 as a retrieval bit, comparison between the retrieval bit and the memorized bit is carried out by the third and the fourth transistors Q3 and Q4. A result of the comparison is delivered to the above-mentioned one of the sense lines 86 through the fifth transistor Q5. In order to retrieve a plurality of retrieval bits, the associative memory cells 88 are arranged along one of the word lines 85 and one of the sense lines 86. Therefore, the result of the comparison by each associative memory cell 88 is delivered to that one of the sense lines 86 through the fifth transistor Q5 of each associative memory cell 88. When the comparison results in matching, the gate of the fifth transistor Q5 of each associative memory cell 88 has a low potential so that the fifth transistor Q5 is put into a non-conductive state. Accordingly, the above-mentioned one of the sense lines 86 is provided with a high potential through the clamp resistor R for precharge and has the high potential. Otherwise, the fifth transistor Q5 is put into a conductive state so that that one of the sense lines 86 has the low potential.

Figures 6, 7:
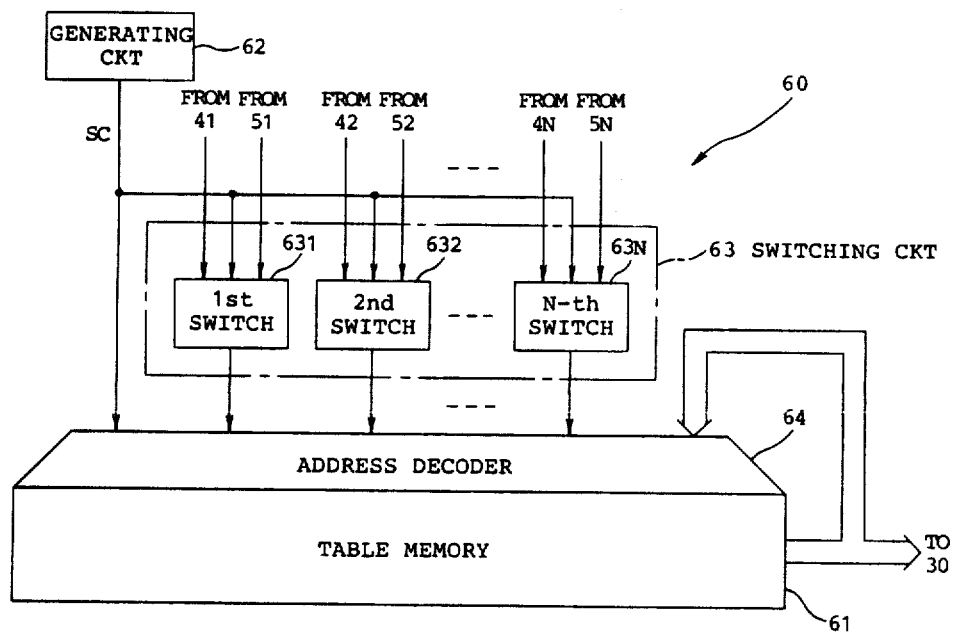
FIG. 6 is a block diagram of a level decision circuit for use in the nest level judging device depicted in FIG. 3.
FIG. 7 shows an example of a table memorized in a table memory for use in the level decision circuit depicted in FIG. 6.

Referring to FIG. 6, the level decision circuit 60 comprises a table memory 61 for memorizing a plurality of nest level as memorized nest level. More specifically, the table memory 61 memorizes a table indicative of the state transition of the state transition diagram illustrated in FIG. 2. The level decision circuit 60 comprises a generating circuit 62 for generating a switch control signal SC. The switch control signal SC is supplied to a switching circuit 63 coupled to the detecting circuit 50 and to the processing circuit 40. The switching circuit 63 is for switching one of the nest bit detection signal and the processed signal in response to the switch control signal SC to produce a switched signal which is N bits long. More specifically, the switching circuit 63 comprises first through N-th switched 631, 632, ..., and 63N supplied with the first through the N-th data end signals DE(1) to DE(N) and with the first and the N-th partial nest bit detection signals ND(1) to ND(N), respectively. The first switch 631 is for switching one of the first partial nest bit detection signal ND(1) and the first data end signal DE(1) in response to the switch control signal SC to produce a first partial switched signal PS(1). Similarly, the second through the N-th switches 631 to 63N are for switching one of the second through the N-th partial nest bit detection signals ND(2) to ND(N) and the second through the N-th data end signals DE(2) to DE(N) in response to the switch control signal SC to produce a second through N-th partial switched signals PS(2) to PS(N), respectively. The switch control signal SC, the switched signal, and each of the selection levels are supplied to the table memory 61 through an address decoder 64 as an address signal. The table memory 61 is accessed by the address signal to produce one of the memorized nest level as the decided nest level.

In the example being illustrated, the switch circuit 63 produces the nest bit detection signal as the switched signal when the switch control signal SC takes the logic "1" level. The switch circuit 63 produces the processed signal as the switched signal when the switch control signal SC takes the logic "0" level.

FIG. 7 shows an example of the table memorized in the table memory 61 illustrated in FIG. 6. For the example being illustrated, the predetermined natural number N is equal to four. The positive integer M is equal to one.

In the illustrated table, a first column (that is, the leftmost column) indicates the switch control signal SC. Second through fifth columns, counted from the first column, indicate the first through the fourth partial switched signals PS(1) to PS(4), respectively. Sixth through ninth columns, counted from the first column, indicate node numbers, namely, numbers suffixed in parentheses to the state nodes to which the state transits from the first through the fourth state nodes S(1), S(2), S(3), and S(4), respectively.

As shown in FIG. 7, a top line or a first row indicates the switch control signal SC, the first through the fourth partial switched signals PS(1) to PS(4), and the first through the fourth state nodes S(1) to S(4). For example, the state transition does not occur as shown in a second row counted from the top line when the first through the fourth partial nest bit detection signals ND(1) to ND(4) are not supplied. Similarly, the state transition does not occur as shown in a sixth row counted from the top line when the first through the fourth data end signals DE(1) to DE(4) are not supplied. As shown in a third row counted from the top line, the state transits from the first state node S(1) to the second state node S(2) when the first partial nest bit detection signal ND(1) is supplied. Similarly, the state transits from the second and the third state node S(2) and S(3) to the third and the fourth state node S(3) and S(4) as shown in fourth and fifth rows counted from the top line, respectively, when the second and the third partial nest bit detection signals ND(2) and ND(3) are supplied, respectively. The state transitions are illustrated in seventh through sixteenth rows counted from the top line when at least one of the first through the fourth data end signals DE(1) to DE(4) is supplied. For example, the state transits from the fourth state node S(4) to the first state node S(1) as shown in the sixteenth rows counted from the top line, namely, a bottom line when the first through the fourth data end signals DE(1) to DE(4) are supplied.

In the second case, those lengths described with reference to FIG. 1(e) are related to one another by:

$$L1 = L2 + L3, \tag{1A}$$

$$L3 = L4 + L5 + L6, \tag{2A}$$

$$\text{and } L6 = L7 + L8. \tag{3A}$$

Figure 8:
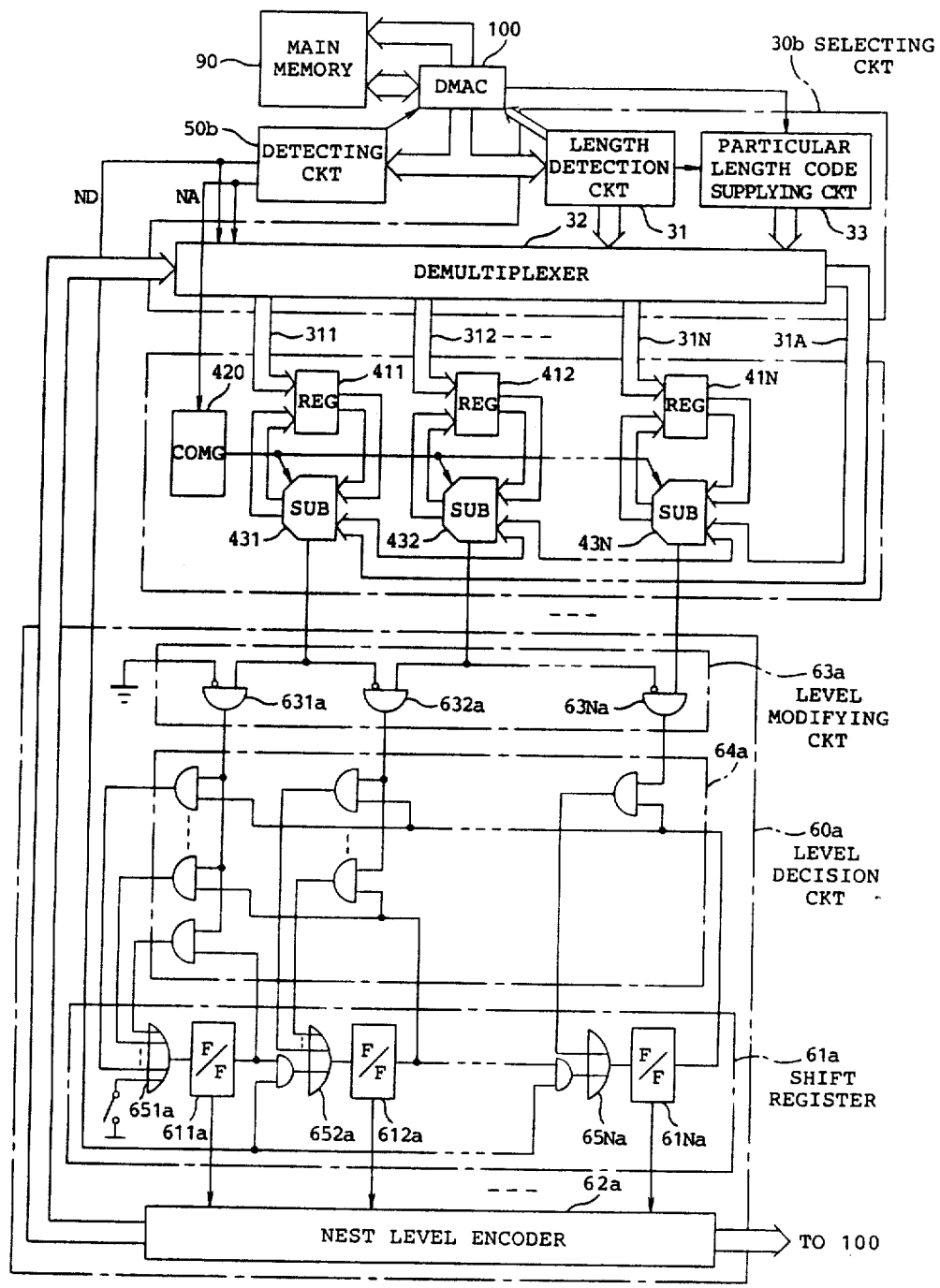
FIG. 8 is a block diagram of a nest level judging device according to a third embodiment of the present invention.

Referring to FIG. 8, a nest level judging device according to a third embodiment of the present invention is for judging the selected level of each of the tokens memorized in a main memory 90 as memorized tokens. The main memory 90 is accessed by a direct memory access controller 100. In the manner which will later become clear, the direct memory access controller 100 is for accessing the main memory 90 to supply the data identifier code and the data length code to a detecting circuit 50b and a selecting circuit 30b, respectively.

Supplied with the data identifier code from the direct memory access controller 100, the detecting circuit 50b is for detecting the nest bit. The detecting circuit 50b produces the nest bit detection signal ND which is one bit long when the nest bit has the logic "1" level. The detecting circuit 50b produces a nest bit absence signal NA which is one bit long when the nest bit has the logic "0" level.

The selecting circuit 30b comprises a length code detection circuit 31 supplied with the data length code for detecting the data length code to produce a detected length code. It is assumed that the data length code is representative of the data length as the second case. The length detection circuit 31 is coupled to a demultiplexer 32 having the first through the N-th output ports 311 to 31N and an additional output port 31A. The demultiplexer 32 is coupled to the detection circuit 50b. After the demultiplexer 32 is supplied with the nest bit detection signal ND, the demultiplexer 32 selects in response to each of successively supplied selection signals one of the first through the N-th output ports 311 to 31N at a time as the selected port to deliver the detected length code to the selected port. The demultiplexer 32 thereby delivers the detected length codes in response to the selection signals to the first through the N-th output ports 311 to 31N as the first through the N-th data codes. The demultiplexer 32 delivers the detected length code in response to the nest bit absence signal NA to the additional output port 31A as a subtrahend code. The selection circuit 30b further comprises a particular length code supplying circuit 33 coupled to the length code detection circuit 31 and the demultiplexer 32. Description of the particular length code supplying circuit 33 will later be made.

The illustrated nest level judging device comprises a processing circuit 40a which is modified from that illustrated in FIG. 3. The processing circuit 40a comprises first through N-th registers 411, 412, . . . , and 41N coupled to the first through the N-th output ports 311 to 31N, respectively. The first through the N-th registers 411 to 41N act as first through N-th holding arrangements for initially holding the first through the N-th data codes as first through N-th held codes, respectively. The processing circuit 40a further comprises a command generator (COMG) 420 coupled to the detecting circuit 50b. The command generator 420 acts as a drive signal generating arrangement for generating a drive signal in response to the nest bit absence signal NA. The first through the N-th registers 411 to 41N are coupled to first through N-th subtracters 431, 432, . . . , and 43N, respectively. Each of the first through the N-th subtracters 431 to 43N is coupled to the command generator 420 and to the additional output port 41A. The first through the N-th subtracters 431 to 43N are for subtracting in response to the drive signal the subtrahend code from the first through the N-th held codes, respectively.

The first through the N-th subtracters 431 to 43N supply first through N-th subtraction results to make the first through the N-th registers 411 to 41N eventually hold the first through the N-th subtraction results as the first through the N-th held codes, respectively. The first through the N-th subtracters 431 to 43N produce the first and the N-th data end signals DE(1) to DE(N) as the processed signal when the first through the N-th subtraction results are equal to zero, respectively. If the first through the N-th held codes indicate zero, the first through the N-th subtracters 431 to 43N do not carry out subtraction operation even though the drive signal is supplied from the command generator 420. In addition, the first through the N-th subtracters 431 to 43N produce the first and the N-th data end signals DE(1) to DE(N) when the first through the N-th data codes indicative of zero are initially held in the first through the N-th registers 411 to 41N as the first through the N-th held codes, respectively.

In the first through the N-th held codes, the first held code always indicates the largest number. Numbers indicated by the first through the N-th held codes become gradually small from the first held code to the N-th held code. As a result, the first data end signal is last produced.

For example, it is assumed that the first, the second, the third, the fourth, the fifth, and the sixth registers 311, 312, 313, 314, 315, and 316 indicate the numbers which are equal to one hundred and twenty (120), eighty (80), sixty (60), thirty (30), thirty (30), and zero (0) at a time, respectively. In this event, the selected level is equal to the fifth nest level. When the nest bit of the logic "0" level is detected and when the data length code indicative of the number equal to thirty (30) is delivered to the first through the sixth registers 311 to 316 through the additional output port 31A from the selecting circuit 30b as the subtrahend code, the first through the sixth subtraction results have the numbers which are equal to ninety (90), fifty (50), thirty (30), zero (0), zero (0), and zero (0). Accordingly, the fourth and the fifth data end signals DE(4) and DE(5) are produced from the fourth and the fifth subtracters 434 and 435. In this event, the selected level is shifted from the fifth nest level to the fourth nest level. In order to decide the selected level, the illustrated nest level judging device comprises a level decision circuit 60a which is modified from that illustrated in FIG. 3.

The level decision circuit 60a is coupled to the detecting circuit 50b and the processing circuit 40a for deciding in response to the nest bit detection signal ND and the processed signal the decided level indicative of the one of the first through the N-th nest levels that is selected as the selected level. The level decision circuit 60a produces the decided level as the one of the selection signals that is supplied to the selecting circuit 30b next following each of the selection signals.

The level decision circuit 60a comprises a shift register 61a coupled to the detecting circuit 50b. The shift register 61a acts as a nest level holding arrangement operable in a normal shift mode for holding a specific nest level to produce an output nest level. The shift register 61a comprises first through N-th flip-flops (F/F's) 611a, 612a, ..., and 61Na connected in cascade to one another and in parallel to the detecting circuit 50b. The first through the N-th flip-flops 611a to 61Na correspond to the first through the N-th nest levels, respectively. The first through the N-th flip-flops 611a to 61Na act as first through the N-th holding elements which are put into the normal shift mode in response to the nest bit detection signal ND sent from the detecting circuit 50b. One of the first through the N-th flip-flops 611a to 61Na is put into a set condition at a time as a set flip-flop. The set flip-flop holds the specific nest level. The output nest level is produced from a selected one of the first through the N-th flip-flops 611a to 61Na. It will be assumed that the first flip-flop 611a is put into the set condition. Responsive to the nest bit detection signal ND, the set condition is shifted from the first flip-flop 611a to the second flip-flop 612a. Accordingly, the second flip-flop 612a is put into the set condition. The first through the N-th flip-flops 611a to 61Na are coupled to a nest level encoder 62a for encoding the output nest level into the decided nest level. The nest level encoder 62a produces the decided nest level as one of the selection signals.

The level decision circuit 60a further comprises a level modifying circuit 63a coupled to the first through the N-th subtracters 431 to 43N for modifying one of the first through the N-th nest levels into a modified nest level determined by that one of the first through the N-th nest levels. The level modifying circuit 63a has first through N-th level positions determined in relation to the first through the N-th nest levels. The level modifying circuit 63a produces a level detection signal through a selected one of the first through the N-th level positions that is indicated by the modified nest level. More specifically, the level modifying circuit 63a comprises first through N-th AND gates 631a, 632a, ..., and 63Na which correspond to the first through the N-th level positions, respectively. The first AND gate 631a has an input supplied with the logic "0" level after it is inverted or the logic "1" level without inversion and another input coupled to the first subtracter 431. Accordingly, the level detection signal is produced through the first AND gate 631a when the first data end signal DE(1) is supplied from the first subtracter 431. The first data end signal DE(1) is supplied to the second AND gate 632a after it is inverted. The second AND gate 632a is direct supplied with the second data end signal DE(2). Similarly, the second through the (N-1)-th data end signals DE(2) to DE(N-1) are supplied to the third through the N-th AND gates 633a to 63Na after they are inverted, respectively. The third through the N-th AND gates 633a to 63Na are direct supplied with the third through the N-th data end signals DE(3) to DE(N), respectively. It is assumed that the second through the fourth data end signals DE(2) to DE(4) are supplied to the level modifying circuit 63a. In this event, the level detection signal is produced through the second AND gate 632a.

The level modifying circuit 63a is coupled to a signal delivering circuit 64a. The signal delivering circuit 64a is coupled to the shift register 61a. The signal delivering circuit 64a is for delivering the level detection signal to a selected one of the first through the N-th flip-flops 611a to 61Na as the specific level when the shift register 61a is not put into the normal shift mode. More specifically, the signal delivering circuit 64a comprises a plurality of AND gates which are divisible into first through N-th groups which are coupled to the first through N-th AND gates 631a to 63Na of the level modifying circuit 63a, respectively. The first group comprises the AND gates which are equal in number to the predetermined natural number, namely, N, and which have inputs coupled to outputs of the first through the N-th flip-flops 611a to 61Na of the shift register 61a. The AND gates of the first group have output coupled to an input of the first flip-flop 611a through a first OR gate 651a.

In general, a j-th group comprises the AND gates which are equal in number to $N-j+1$ where j represents an integer consecutively variable from one to the predetermined natural number N. The AND gates of the j-th group have inputs coupled to outputs of a j-th through the N-th flip-flops 61ja to 61Na of the shift register 61a. The AND gates of the j-th group have outputs coupled to an input of the j-th flip-flop 61ja through a j-th OR gate 65ja. Accordingly, the AND gates of the j-th group form a j-th feedback path for delivering contents of the j-th through the N-th flip-flops 61ja to 61Na to the j-th flip-flop 61ja when the level detection signal is supplied from a j-th AND gate 63ja of the level modifying circuit 63a. It is assumed that the fourth flip-flop 614a is put into the set condition, that is, the selected level is equal to the fourth nest level. Under the circumstances, the set condition is shifted from the fourth flip-flop 614a to the second flip-flop 612a if the level detection signal is supplied from the second AND gate 632a. That is, the selected level is shifted from the fourth nest level to the second nest level.

Attention will be directed to the particular length code supplying circuit 33. As is known in the art, each of the data length codes of the respective tokens may comprise either an undecided length code or an end code. The undecided length code indicates that the data length is undecided. The end code indicates an end of the undecided length code. The undecided length code is a one-byte code indicative of hexadecimal 80. The end code will be called an end of communication (EOC) code and is a two-byte code indicative of hexadecimal 0000. The length detection circuit 31 produces an undecided length detection signal when the undecided length code is detected thereby. The length detection circuit 31 also produces an end detection signal when the end code is detected thereby. The particular length code supplying circuit 33 supplies a maximum length code to the demultiplexer 32 in response to the undecided length detection signal. The particular length code supplying circuit 33 supplies a null length code to the demultiplexer 32 in response to the end detection signal. The maximum length code represents that the data length has a maximum length. The null length code represents that the data length has a length of zero. The demultiplexer 32 delivers the maximum length code to the selected port as a particular port. The demultiplexer 32 delivers the null length code to the particular port.

Referring to FIGS. 9 and 10 in addition to FIG. 8, attention will be directed to the direct memory access controller 100.

In FIG. 9, it will be assumed that the main memory 90 has a first memory area 91. The first memory area 91 is for memorizing the tokens illustrated in FIG. 1(e). More specifically, the data identifier code ID*(1) is memorized in a part represented by an address A(1) of the first memory area 91, as illustrated in FIG. 9. The data length code LL(1) is memorized in another part represented by another address A(2) of the first memory area 91 that next follows the address A(1), as illustrated in FIG. 9. Likewise, the data DATA(4) is memorized in a different part represented by successive addresses A(23), A(24), A(25), and A(26), as illustrated in FIG. 9.

In FIG. 10, it will be assumed that the main memory 90 has a second memory area 92. The second memory area 92 is for storing a result processed by the nest level judging device illustrated in FIG. 8. The second memory area 92 is assigned with successive addresses B(1), B(2), B(3), B(4), B(5), B(6), B(7), and B(8) as shown in a first column or leftmost column of FIG. 10. A second column counted from the leftmost column indicates read addresses of the respective input codes read by the direct memory access controller 100. A third column counted from the leftmost column indicates data identifier codes memorized in the respective read addresses. A fourth column counted from the leftmost column indicates data length codes which next follow the respective data identifier codes. A fifth column counted from the leftmost column indicates the nest bits included in the respective data identifier codes. A sixth column counted from the leftmost column, namely, the rightmost column indicates the selected levels of the tokens which comprise the respective data identifier codes.

The addresses A(1) and B(1) of the main memory 90 are initially set in the direct memory access controller 100. The direct memory access controller 100 accesses, at first, the main memory 90 to read the input code memorized in the address A(1) as a read code and to supply the read code to the detecting circuit 50b (FIG. 8). In this event, the direct memory access controller 100 is supplied with the nest bit detected by the detecting circuit 50b as a detected nest bit. Subsequently, the direct memory access controller 100 accesses the main memory 90 to read the input code memorized in the next following address A(2) as another read code and to supply the another read code to the length detection circuit 31. In this event, the direct memory access controller 100 is supplied with the detected length code from the length detection circuit 31. In addition, the selected level is supplied from the nest level encoder 62a to the direct memory access controller 100.

The direct memory access controller 100 successively accesses the main memory 90 to write the read address or the address A(1), the read codes or the data identifier code ID*(1) and the data length code LL(1), the detected nest bit of the logic "1" level, and the selected level equal to the M-th nest level into the address B(1) as illustrated in a top or a first line of FIG. 10.

In response to the detected nest bit and the detected length code, the direct memory access controller 100 determines an address which should be accessed in the main memory 90 and from which the input code, namely, the next following header is read as a determined address. When the detected nest bit has the logic "1" level, the determined address is equal to an address next following the read address for use in reading the data length code. If the detected nest bit has the logic "0" level, the determined address is equal to an address which is equal to the read address for reading the data length code plus the data length indicated by the detected length code.

In the example being illustrated, the determined address is equal to the address A(3) because the data identifier code ID*(1) includes the nest bit of the logic "1" level. Next, the next following header is processed by the nest level judging device. As a result, the result processed by the nest level judging device is stored in the second memory area 92 of the main memory 90 as illustrated in FIG. 10.

Figure 11:
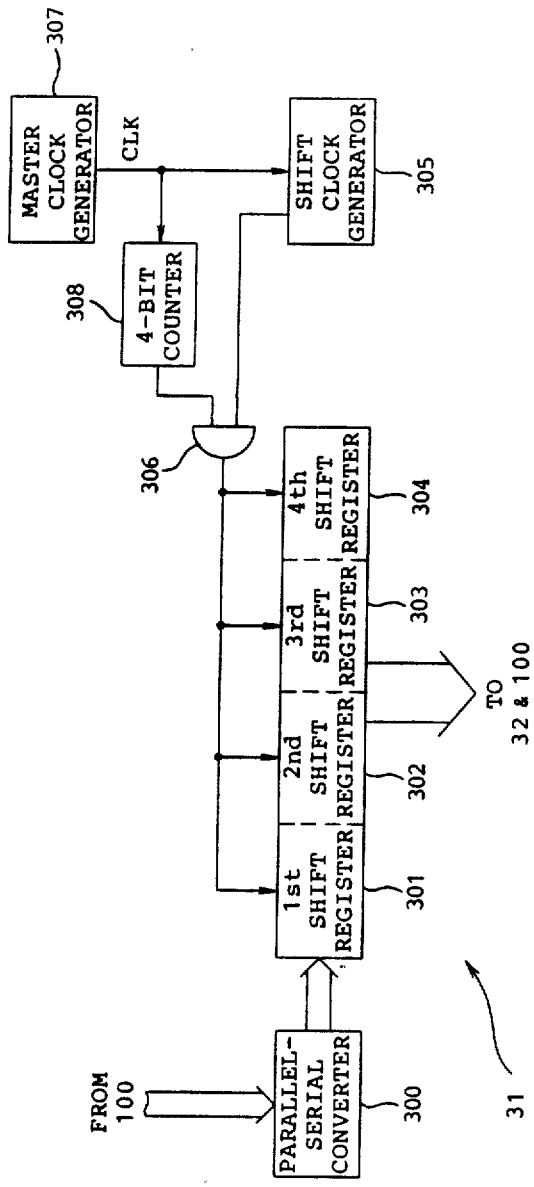
FIG. 11 is a block diagram of a length detection circuit for use in the nest level judging device depicted in FIG. 8.

Referring to FIG. 11, description will be made as regards the length detection circuit 31. It is assumed that the data length code comprises four partial length codes, each of which is one byte long. The illustrated length detection circuit 31 comprises a parallel-serial converter 300 successively supplied with the partial length codes from the direct memory access controller 100. The parallel-serial converter 300 converts each of the partial length codes from bit parallel to bit serial form. The parallel-serial converter 300 produces serialized bits. The parallel-serial converter 300 is coupled to first through fourth shift registers 301, 302, 303, and 304 connected in cascade to one another and supplied with a shift clock signal having a predetermined shift clock frequency. Responsive to the shift clock signal, the serialized bits are delivered in a direction from the first shift registers 301 to the fourth shift registers 304. The shift clock signal is supplied from a shift clock generator 305 through an AND gate 306. The shift clock generator 305 is supplied with a master clock signal CLK generated by a master clock generator 307. The master clock signal CLK has a predetermined master clock frequency. The predetermined shift clock frequency is sixteen times of the predetermined master clock frequency. The master clock generator 307 produces the master clock signal CLK only when the data length code is supplied. The master clock signal CLK is also supplied to a four-bit counter 308. When the four-bit counter 308 counts up to a count equal to four, the four bit counter 308 supplies a stop signal of the logic "0" level to the AND gate 306. In this event, the shift clock signal is not supplied to the first through the fourth shift registers 301 to 304. Accordingly, the detected length code is supplied from the first through the fourth shift registers 301 to 304.

Figure 12:
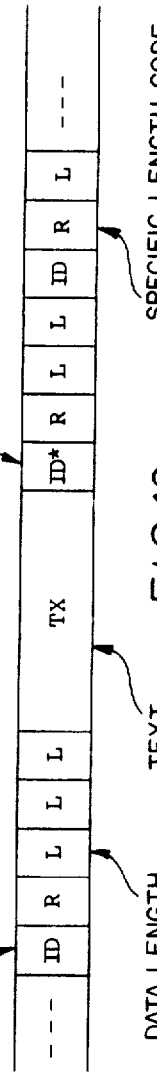
FIG. 12 shows an example of data length codes included in tokens.

Referring to FIG. 12, description will be made as regards the data length codes included in the headers of the respective tokens. Each of the data length codes comprises a specific length code and a plurality of partial length codes. Each of the data length codes may comprise only the specific length code. The specific length code is one byte long and will be called an R code. Each of the partial length codes is one byte long and will be referred to as an L code. The R code indicates the number of the L codes in each header and has a most significant bit (MSB) which has either the logic "1" level or the logic "0" level. When the MSB of the R code has the logic "0" level, the data length code comprises only the R code. If the MSB of the R code has the logic "1" level, the R code except the MSB thereof indicates the number of the L codes which next follow the R code. In this event, the data length is represented by the L codes. This is prescribed by the above-mentioned layer protocol of OSI (Open Systems Interconnection).

Figure 13:
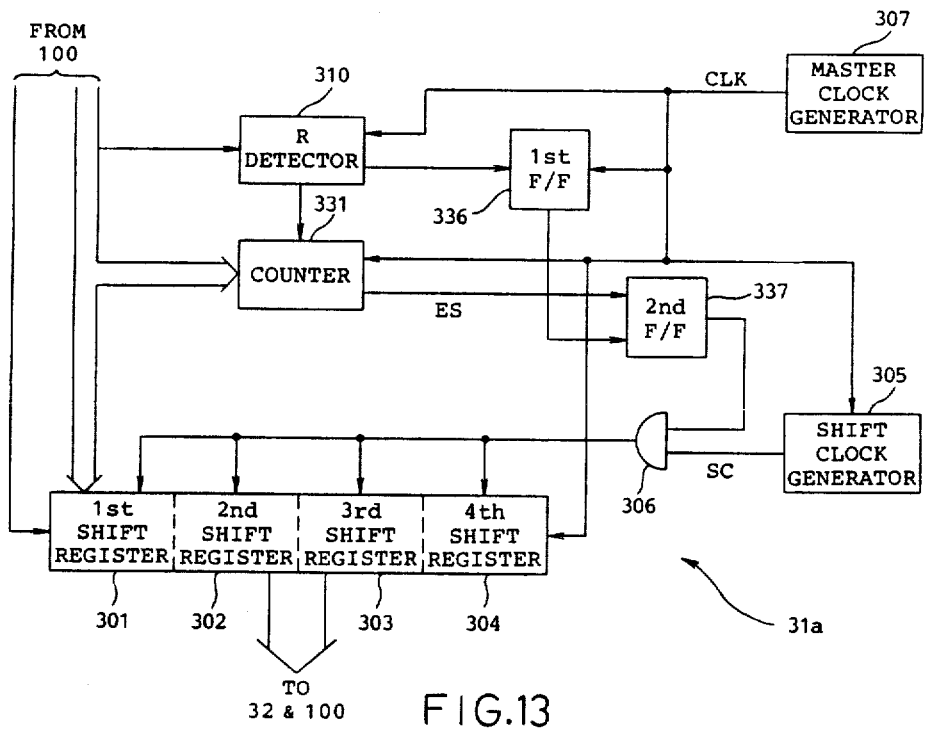
FIG. 13 is a block diagram of another length detection circuit for detecting each of the data length codes depicted in FIG. 12 and for use in the nest level judging device depicted in FIG. 8.

Referring to FIG. 13, description will be made as regards another length detection circuit 31a for detecting each of the data length codes described with reference to FIG. 12. The illustrated length detection circuit 31a comprises an R detector 310 for detecting the MSB of the R code. The R code of the data length code is at first set in the first shift register 301. If the MSB of the R code has the logic "0" level, the shift clock signal SC is not supplied to the first through the fourth shift registers 301 to 304. In this event, only the R code set in the first shift register 301 is used as the detected length code.

The R detector 310 is coupled to a counter 331. When the MSB of the R code has the logic "1" level, the R detector 310 supplies a set signal to the counter 331 to make the counter 331 set the R code except the MSB thereof as a set code. The counter 331 is supplied with the master clock signal CLK. The master clock signal CLK comprises master clock pulses. The counter 331 counts down, as a count, the set code in synchronism with each of the master clock pulses. When the counter 331 counts down the count to zero, the counter 331 produces an end signal ES. The R detector 310 produces an R detection signal when the MSB of the R code has the logic "1" level. The R detector 310 is coupled to a first flip-flop 336 supplied with the master clock signal CLK. The first flip-flop 336 is set in response to a trailing edge of each of the master clock pulses and is reset in response to a trailing edge of the R detection signal. The first flip-flop 336 is coupled to a second flip-flop 337 supplied with the end signal ES. The second flip-flop 337 is set in response to a trailing edge of an output signal of the first flip-flop 336 and is reset in response to the end signal ES. The second flip-flop 337 is coupled to the AND gate 306. When the second flip-flop 337 produces an output signal of the logic "1" level, the shift clock signal SC generated by the shift clock generator 305 is delivered to the first through the fourth shift registers 301 to 304 through the AND gate 306. The first shift register 301 is supplied with a set/reset signal from the direct memory access controller 100.

Figure 14:
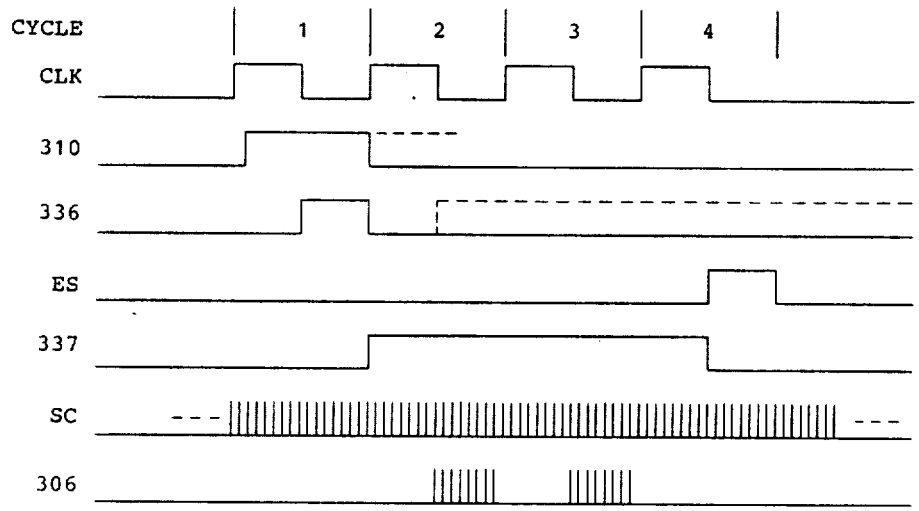
FIG. 14 is a time chart for use in describing operation of the length detection circuit depicted in FIG. 13.

Referring to FIG. 14 in addition to FIG. 13, operation of the length detection circuit 31a will be described. First through fourth clock cycles are indicated by numerals 1 through 4 along a first or top line labelled CYCLE in FIG. 14. The master clock signal CLK generated by the master clock generator 307 is depicted along a second line from the top. The shift clock signal SC generated from the shift clock generator 305 is depicted along a seventh line from the top. It will be assumed that the R code has the MSB of the logic "1" level and indicates three as the number of the L codes. In this event, the data length code comprises three L codes which are first through third L codes.

In the first clock cycle, the R code is set in the first shift register 301. The R detector 310 detects the MSB of the R code. Inasmuch as the MSB of the R code has the logic "1" level, the R detection signal is supplied from the R detector 310 to the first flip-flop 336 in the manner depicted along a third line from the top. In addition, the R detector 310 delivers the set signal to the counter 331. Responsive to the set signal, the counter 331 sets the R code except the MSB thereof as the set code. In this event, the set code indicates a number which is equal to three. Responsive to the trailing edge of each master clock pulse of the master clock signal CLK, the first flip-flop 336 is set and holds the logic "1" level in the manner depicted along a fourth line from the top. The first flip-flop 336 is reset in response to the trailing edge of the R detection signal and holds the logic "0" level after lapse of a half cycle of the master clock pulse from a time when the first flip-flop 336 is set.

In the second clock cycle, the first L code is set in the first shift register 301. Accordingly, the R code set in the first shift register 301 is erased. Responsive to the trailing edge of the output signal of the first flip-flop 336, the second flip-flop 337 is set and holds the logic "1" level in the manner depicted along a sixth line from the top. The counter 331 is decremented by one in response to the trailing edge of the master clock pulse and counts down the count to two. Inasmuch as the second flip-flop 337 holds the logic "1" level, the shift clock signal SC generated from the shift clock generator 305 is supplied to the first through the fourth shift registers 301 to 304 through the AND gate 306 in the manner depicted along an eighth line from the top, namely, along the bottom line. Accordingly, the first L code set in the first shift register 301 is shifted to the second shift register 302.

In the third clock cycle, the second L code is set in the first shift register 301. Similarly, the counter 331 is decremented by one in response to the trailing edge of the master clock pulse and counts down the count to one. Inasmuch as the second flip-flop 337 holds the logic "1" level, the shift clock signal SC is supplied to the first through the fourth shift registers 301 to 304 through the AND gate 306. Accordingly, the first and the second L codes are shifted from the second and the first shift registers 302 and 301 to the third and the second shift registers 303 and 302, respectively.

In the fourth clock cycle, the third L code is set in the first shift register 301. Similarly, the counter 331 is decremented by one in response to the trailing edge of the master clock pulse and counts down the count to zero. Accordingly, the counter 331 delivers the end signal ES to the second flip-flop 337 in the manner depicted along a fifth line from the top. Responsive to the end signal ES, the second flip-flop 337 is reset and holds the logic "0" level. Inasmuch as the second flip-flop 337 holds the logic "0" level, the shift clock signal SC is not supplied to the first through the fourth shift registers 301 to 304 through the AND gate 306. In this event, the first through the third L codes are collectively supplied, as the detected length code, from the first through the third shift registers 301 to 303 to the demultiplexer 32 illustrated in FIG. 8.

What is claimed is:

1. A nest level judging device operated in response to a plurality of tokens one at a time, each of said tokens being given a nest level selected from first through N-th nest levels as a selected level, where N represents a predetermined natural number, said first through said N-th nest levels being a lowest through a highest nest level, respectively, each of said tokens comprising a header and a data set, said data set having a data length and being for nesting one of said tokens that has a higher nest level than said selected level, said header comprising a data length code representatives of said data length and a data identifier code which includes a nest bit indicative of whether or not said one of the tokens is nested in said data set, said nest level judging device being for judging said selected level and comprising:

- detecting means supplied with said data identifier code for detecting said nest bit to produce a nest bit detection signal when said nest bit indicates that said one of the tokens is nested in said data set;
- selecting means supplied with said header and having first through N-th output ports in correspondence to said first through said N-th nest levels, respectively, for selecting in response to each of successively supplied selection signals said first through said N-th output ports one as a selected port at a time to deliver said data length code to said selected port, said selecting means thereby delivering the data length codes of the respective tokens in response to said selection signals to said first through said N-th output ports as first through N-th data codes;
- processing means coupled to said selecting means for processing said first through said N-th data codes into a processed signal which is N bits long; and
- level decision means coupled to said detecting means and said processing means for deciding in response to said nest bit detection signal and said processed signal a decided nest level indicative of one of said first through said N-th nest levels that is selected as said selected level, said level decision means supplying said selecting means with said decided nest level as one of said selection signals that next follows said each of the selection signals.

2. A nest level judging device as claimed in claim 1, wherein said processing means comprises first through N-th end signal producing means coupled to said first through said N-th output ports, respectively, for holding said first through said N-th data codes as first through N-th held codes, respectively, and for decreasing said first through said N-th held codes to produce first through N-th data end signals as said processed signal when said first through said N-th held codes are decreased to zero, respectively.

3. A nest level judging device as claimed in claim 1, said nest bit detection signal consisting of first through N-th bits, wherein:

- said selecting means further has first through N-th additional output ports in correspondence to said first through said N-th nest levels, respectively, and is furthermore for selecting in response to said each of the successively supplied selection signals said first through said N-th additional output ports one as a selected additional port at a time to deliver said data identifier code to said selected additional port, said selecting means thereby delivering the data identifier codes of the respective tokens in response to said selection signals to said first through said N-th additional ports as first through N-th identifier codes;
- said detecting means comprising first through N-th associative memory means coupled to said first through said N-th additional output ports, respectively, said first through said N-th associative memory means having memory locations for preliminarily memorizing first through N-th memorized identifier codes, respectively, and being for deciding match between said first through said N-th identifier codes and one of said first through said N-th memorized identifier codes to produce first through N-th identified codes representative of the memory locations for said first through said N-th memorized identifier codes, respectively, said first through N-th associative memory means producing first through N-th partial nest bit detection signals as said first through said N-th bits of the nest bit detection signal, respectively.

4. A nest level judging device as claimed in claim 1, said nest bit detecting signal being N bits long, wherein said level decision means comprises:

- generating means for generating a switch control signal;
- switching means coupled to said generating means, said detecting means, and said processing means for switching one of said nest bit detection signal and said processed signal in response to said switch control signal to produce a switched signal which is N bits long; and
- memorizing means coupled to said generating means and said switching means for memorizing a plurality of nest level as memorized nest levels, said memorizing means being accessed by said switch control signal, said switched signal, and said each of the selection signals to produce one of said memorized nest level as said decided nest level.

5. A nest level judging device as claimed in claim 1, wherein:

- said selecting means further produces in response to said each of the selection signals a choosing signal which is N bits long;
- said detecting means comprising:
- extracting means supplied with said data identifier code for extracting said nest bit to produce an extracted nest bit; and
- signal producing means coupled to said extracting means and said selecting means for producing said choosing signal as said nest bit detection signal when said extracted nest bit indicates that said one of the tokens is nested in said data set.

6. A nest level judging device as claimed in claim 1, wherein:

- said detecting means produces a nest bit absence signal when said nest bit indicates that said one of the tokens is not nested in said data set;
- said selecting means having an additional output port and being coupled to said detecting means for delivering said data length code in response to said nest bit absence signal to said additional output port as a subtrahend code;
- said processing means comprising:
- first through N-th holding means coupled to said first through said N-th output ports, respectively, for initially holding said first through said N-th data codes as first through N-th held codes, respectively;
- drive signal generating means coupled to said detecting means for generating a drive signal in response to said nest bit absence signal; and
- first through N-th subtracting means coupled to said drive signal generating means, to said additional output port, and to said first through said N-th holding means, respectively, for subtracting in response to said drive signal said subtrahend code from said first through said N-th held codes, respectively, to supply first through N-th subtraction results to said first through said N-th holding means to make said first through said N-th holding means eventually hold said first through said N-th subtraction results as said first through said N-th held codes, respectively, said first through said N-th subtracting means producing first through N-th data end signals as said processed signal when said first through said N-th subtraction results are equal to zero, respectively.

7. A nest level judging device as claimed in claim 6, wherein said level decision means comprises:

nest level holding means coupled to said detecting means and operated in a normal shift mode for holding a specific nest level to produce an output nest level, said nest level holding means comprising first through N-th holding elements connected in cascade to one another and connected in parallel to said detecting means, said first through said N-th holding elements being put into said normal shift mode in response to said nest bit detection signal sent from said detecting means, said output nest level being produced from a selected one of said first through said N-th holding elements;

encoding means coupled to said first through said N-th holding elements for encoding said output nest level into said one of the selection signals;

level modifying means coupled to said first through said N-th subtracting means for modifying said one of the first through the N-th nest levels into a modified nest level determined by said one of the first through the N-th nest levels, said level modifying means having first through N-th level positions determined in relation to said first through said N-th nest levels and producing a level detection signal through a selected one of said first through said N-th level positions that is indicated by said modified nest level; and signal delivering means coupled to said level modifying means and said nest level holding means for delivering said level detection signal to a selected one of said first through said N-th holding elements as said specific level when said nest level holding means is not put into said normal shift mode.

8. A nest level judging device as claimed in claim 1, said tokens being memorized in a main memory, wherein said nest level judging device further comprises accessing means coupled to said main memory, said detecting means, and said selecting means for accessing to said main memory to supply said data identifier code and said data length code to said detecting means and said selecting means, respectively.

9. A nest level judging device as claimed in claim 1, wherein said selecting means comprises:

length detection means supplied with said data length code for detecting said data length code to produce a detected length code; and demultiplexing means having said first through said N-th output ports and coupled to said length detection means for delivering said detected length code in response to said each of the selection signals to said selected port.

10. A nest level judging device as claimed in claim 9, the data length codes of the respective tokens comprising an undecided length code and an end code indicative of an end of said undecided length code, said undecided length code indicating that said data length is undecided, wherein:

said length detection means produces an undecided length detection signal and an end detection signal when said undecided length code and said end code are detected by said length detection means, respectively;

said selecting means further comprising particular length code supplying means coupled to said length detection means and said demultiplexing means for supplying a maximum length code and a null length code to said demultiplexing means in response to said undecided length detection signal and said end detection signal, respectively, said maximum length code representing that the data length has a maximum length, said null length code representing that the data length has a length of zero;

said demultiplexing means delivering said maximum length code to said selected port as a particular port and delivering said null length code to said particular port.

* * * * *